United States Patent Office 3,080,369
Patented Mar. 5, 1963

3,080,369
HYDRAZINOPTERIDINE DERIVATIVES
Irwin J. Pachter, Erdenheim, and Joseph Weinstock, Phoenixville, Pa., assignors to Smith Kline & French Laboratories, Philadelphia, Pa., a corporation of Pennsylvania
No Drawing. Filed May 5, 1961, Ser. No. 107,885
7 Claims. (Cl. 260—251.5)

This invention relates to novel hydrazinopteridine derivatives having pharmacodynamic, and, more specifically, diuretic activity.

Illustrative of this invention are the pteridine compounds represented by the following structural formula:

FORMULA I

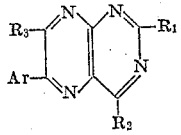

in which:
Ar represents tolyl, methoxyphenyl, fluorophenyl or, preferably, phenyl and thienyl; and
$R_1$, $R_2$ and $R_3$ represent hydrazino, methylhydrazino, dimethylhydrazino and amino, only one of $R_1$, and $R_2$ and $R_3$ being a hydrazino member.

The advantageous compounds of this invention are those of Formula I in which Ar is phenyl or thienyl, $R_3$ is hydrazino, $R_1$ and $R_2$ are amino. The most preferred compound is 2,4-diamino-7-hydrazino-6-phenylpteridine.

The nontoxic, pharmaceutically acceptable, acid addition salts of the compounds of this invention are fully equivalent to the stable basic compounds and are prepared in standard methods usually in an organic solvent with inorganic or organic acids such as hydrochloric, sulfuric, phosphoric, ethanedisulfonic, maleic or sulfamic acid. As an example of such methods of preparation, the hydrazinopteridine is dissolved in dimethylformamide-cyclohexane and reacted with an excess of ethanolic hydrogen chloride. The salt is separated by crystallization.

The hydrazinopteridine derivatives of this invention are most conveniently prepared from the corresponding 2,4 or 7-chloro intermediates by reaction with an excess of hydrazine. The reaction often takes place spontaneously, however, usually the reaction mixture is heated for up to several hours at temperatures up to the boiling point of the reaction mixture. An organic solvent in which the starting material is substantially soluble can optionally be used as a reaction medium if smaller quantities of the hydrazine reactant are used. If an acid addition salt of the chloropteridine is used as starting material, an additional quantity of the hydrazine is usually used.

The important chloro intermediates are new compounds and are represented by the following structure:

FORMULA II

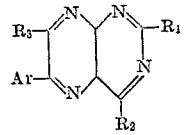

in which Ar is as defined for Formula I; $R_1$, $R_2$ and $R_3$ are chloro and amino, only one of which is chloro. These compounds are prepared by halogenating the known hydroxy congeners with standard halogenating agents such as halo esters, for example using phosphorous pentachloride in phosphorous oxychloride. The 2,4 and 7-hydroxypteridines are prepared by the methods of Spickett and Timmis, J. Chem. Soc., 1954, 2887. The acid addition salts of the intermediates can be used equivalently either by neutralizing the salt before reaction with hydrazine or by using an excess of the hydrazine starting material.

The foregoing description and the following examples are merely exemplary of the scope of this invention. Other obvious equivalents to the structures detailed herein will be apparent to one skilled in the art and are meant to be included in this invention. Such modifications include lower alkyl groups, such as methyl, substituted on the amino groups on the pteridine nucleus or other substituents on the phenyl or thienyl moiety located at position 6.

Example 1

A mixture of 25 g. of finely powdered 2,4-diamino-7-hydroxy-6-phenylpteridine, 125 g. of phosphorous pentachloride and 1.25 l. of phosphorous oxychloride is heated at reflux for two hours. The oxychloride is removed in vacuo and about 250 ml. of a crushed ice slurry added cautiously to the dry residue under cooling. After cooling, the solid is separated and washed with 2% hydrochloric acid giving 2,4-diamino-6-phenyl-7-chloropteridine hydrochloride.

The salt is dissolved in boiling dilute hydrochloric acid solution and neutralized with concentrated ammonia to separate the base.

A mixture of 5 g. of the base and 30 ml. of 95% hydrazine is prepared. After spontaneous heating, the mixture is boiled for several minutes, then cooled in an ice box to give an orange-yellow solid, 2,4-diamino-6-phenyl-7-hydrazinopteridine. This material is recrystallized from dimethylformamide.

Example 2

A mixture of 5 g. of 2,4-diamino-6-α-thienyl-7-hydroxypteridine (prepared by reacting 10 g. of 2,4,6-triamino-5-nitrosopyrimidine with 100 ml. of α-thienylacetyl chloride), 25 g. of phosphorous pentachloride and 350 ml. of phosphorous oxychloride is heated at reflux for four hours. Evaporation and quenching in an ice slurry as in Example 1 gives the desired 2,4-diamino-7-chloro-6-α-thienylpteridine. This material, 1 g., is heated briefly on the steam bath with 10 ml. of hydrazine to give the desired 2,4-diamino-7-hydrazine-6-α-thienylpteridine.

Example 3

A mixture of 2.5 g. of 2,4-diamino-7-hydroxy-6-methoxyphenylpteridine, 15 g. of phosphorous pentachloride and 250 ml. of phosphorous oxychloride is heated at reflux for several hours, evaporated and quenched to give the 7-chloro intermediate which (1.2 g.) is heated with 5 g. of dimethylhydrazine, then cooled to give the desired 2,4-diamino-7-dimethylhydrazino - 6 - p - methoxyphenylpteridine.

Example 4

A mixture of 5 g. of 4,7-diamino-2-hydroxy-6-phenylpteridine 25 g. of phosphorus phentachloride and 300 ml. of phosphorous oxychloride is heated at reflux for five hours, evaporated and quenched to give 2-chloro-4,7-diamino-6-phenylpteridine. This material (2 g.) is heated with 15 ml. of hydrazine then cooled to give 4,7-diamino-2-hydrazino-6-phenylpteridine.

Example 5

A mixture of 2 g. of 2,7-diamino-4-hydroxy-6-p-fluorophenylpteridine (prepared from 2.5 g. of 2,4-diamino-6-hydroxy-5-nitrosopyrimidine and 2.4 g. of p-fluorophenylacetonitrile in ethylene glycol), 12 g. of phosphorus pentachloride in 200 ml. of phosphorus oxychloride is heated for four hours then evaporated and quenched to give the desired 4-chloro intermediate. This compound (1 g.) in dimethylforamide is heated at reflux for several hours with 1 g. of methylhydrazine to give the desired 2,7-diamino-6-p-fluorophenyl-4-methyl-hydrazinopteridine.

*Example 6*

A mixture of 2.3 g. of 2,7-diamino-4-hydroxy-6-phenylpteridine, 15 g. of phosphorous pentachloride and 200 ml. of phosphorous oxychloride is heated at reflux evaporated and quenched as in Example 1 to give 4-chloro-2,7-diamino-6-phenylpteridine. This intermediate (1.3 g.) is reacted with an excess of hydrazine and cooled to give 2,7-diamino-4-hydrazino-6-phenylpteridine.

*Example 7*

A mixture of 1.2 g. of 4,7-diamino-2-hydroxy-6-o-tolylpteridine (prepared from 4,6-diamino-2-hydroxy-5-nitrosopyrimidine and o-tolylacetonitrile in ethylene glycol), 10 g. of phosphorous pentachloride and 150 ml. of phosphorous oxychloride is reacted as in Example 1 to give the 2-chloro intermediate which is reacted with an excess of hydrazine to give 4,7-diamino-2-hydrazino-6-o-tolylpteridine.

This material (200 mg.) is dissolved in dimethylformamide reacted with an excess of maleic acid and the salt separated by crystallization.

*Example 8*

A mixture of 1.8 g. of 4,7-diamino-2-hydroxy-6-β-thienylpteridine (prepared by reacting 4,6-diamino-2-hydroxy-5-nitrosopyrimidine with β-thienylacetonitrile), 15 g. of phosphorous pentachloride and 175 ml. of phosphorous oxychloride is reacted and worked up to give 2-chloro intermediate. This compound (1.4 g.) is reacted with an excess of hydrazine as in Example 1 to give 4,7-diamino-2-hydrazino-6-β-thienylpteridine.

What is claimed is:

1. A chemical compound selected from the group consisting of a free base and its nontoxic, pharmaceutically acceptable acid addition salts, said free base being of the formula:

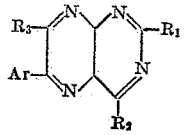

in which Ar is a member selected from the group consisting of phenyl, thienyl, tolyl, methoxyphenyl and fluorophenyl; and $R_1$, $R_2$ and $R_3$ are members selected from the group consisting of amino, dimethylhydrazino, methylhydrazino and hydrazino, only one of $R_1$, $R_2$ and $R_3$ being a hydrazino member.

2. A chemical compound of the formula:

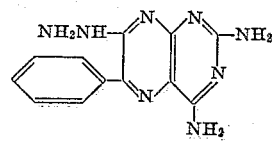

3. A chemical compound of the formula:

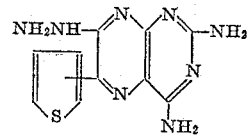

4. A chemical compound of the formula:

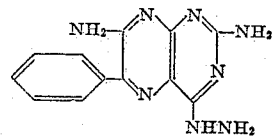

5. A chemical compound of the formula:

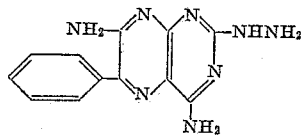

6. A chemical intermediate of the formula:

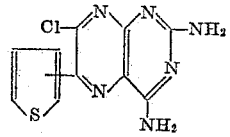

7. A chemical intermediate of the formula:

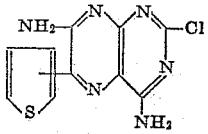

References Cited in the file of this patent

UNITED STATES PATENTS 2,940,972    Roch ------------------ June 14, 1960

OTHER REFERENCES

Degering: Organic Nitrogen Compounds (1950), page 376.

Spickett et al.: J. Chem. Soc. (1954), pages 2887–95.

Doctor: J. Biological Chemistry, vol. 232 (1958), pages 617–25.